April 15, 1969     W. E. FIDLER     3,438,825
METHOD OF APPLYING ANTI-SKID AGENTS TO SHAPED
PLASTIC ARTICLES BY SPIN-WELDING
Filed April 27, 1965
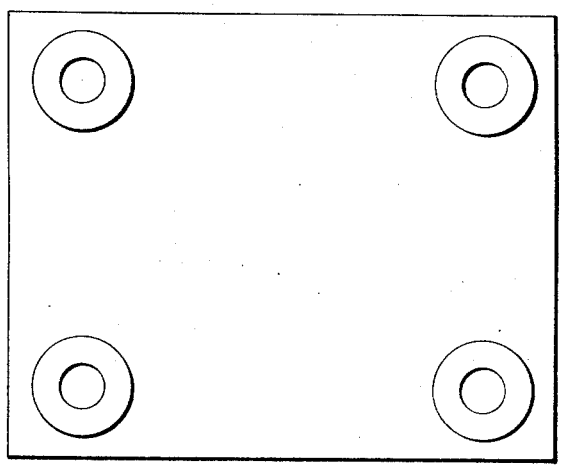
FIG. 1
BOTTOM SURFACE
POLYETHYLENE BOX
FIG. 2
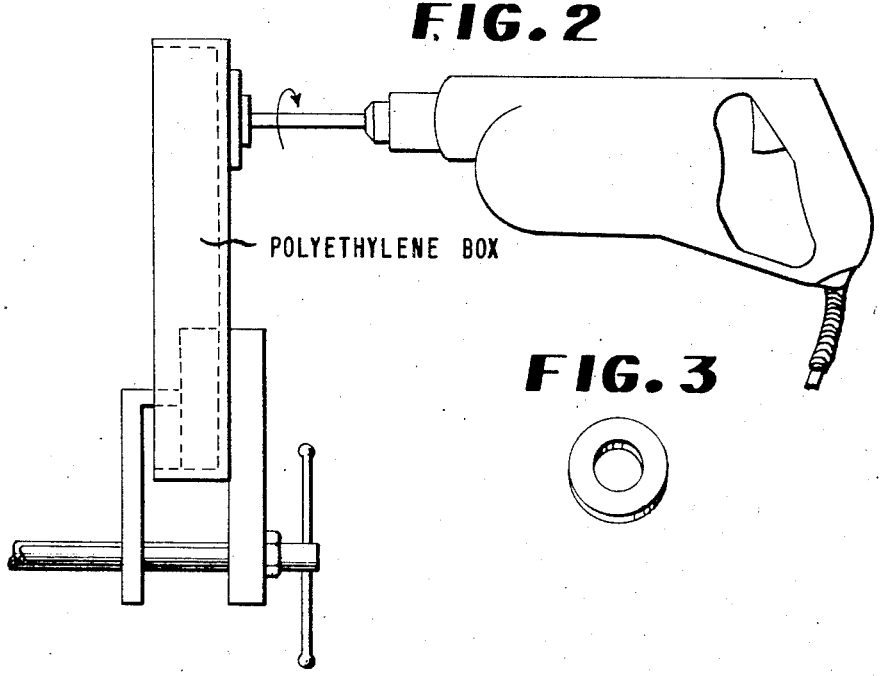
POLYETHYLENE BOX
FIG. 3
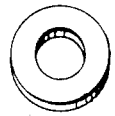
INVENTOR
WILLIAM EDWARD FIDLER
BY
ATTORNEY United States Patent Office 3,438,825
Patented Apr. 15, 1969

3,438,825
METHOD OF APPLYING ANTI-SKID AGENTS TO SHAPED PLASTIC ARTICLES BY SPIN-WELDING
William Edward Fidler, Saskatoon, Saskatchewan, Canada, assignors, by mesne assignments, to E. I. du Pont de Nemours and Company, Wilmington, Del., a corporation of Delaware
Filed Apr. 27, 1965, Ser. No. 451,321
Int. Cl. B32b 27/08
U.S. Cl. 156—73      5 Claims

ABSTRACT OF THE DISCLOSURE

A method is disclosed for imparting anti-skid properties to the polymeric surface of an article such as a polyethylene box. The method involves adhering to the surface an anti-skid agent prepared from polymeric compositions of ethylene/vinyl acetate copolymers or blends of the copolymers with polyethylene. Preferably, the anti-skid agent is in the shape of a ring which is spin-welded to the surface.

---

The present invention relates to a novel anti-skid treatment of shaped plastic articles and, in particular, to a process for increasing the surface friction of such plastic articles by the application of a novel anti-skid agent.

The anti-skid treatment of the present invention will be especially useful in that part of the packaging industry which is concerned with bags, boxes, crates or other containers made from plastic materials such as polyolefins or polyamides. It is, for example, well-known that heavy-wall bags made from polyolefins have advantages over multi-wall paper bags because they are transparent and water- and moisture-proof. However, because of relatively low friction properties these heavy-wall bags tend to slide over each other and shift nad topple when piled or when pallet loads of such bags are transported from one place to another. High friction properties are also desirable in those instances in which articles such as tote boxes or beer-cases are required to run up inclines on conveyor belt systems or are required to remain in place firmly when loaded on pallets.

Many attempts have been made in the past for increasing the friction properties of the surfaces of plastic articles in order to increase the resistance to sliding. Thus, boxes made from polyethylene have been provided with rubber inserts in their base or have had adhesives applied to their base. Adhesives have also been applied to bags made from polyethylene or a rough, hard powder, incorporated in a tough printing ink or varnish, has been applied to such bags.

It is an object of the present invention to provide a practical and economic process for creating a surface upon plastic articles which will increase the resistance to sliding.

A further object of the present invention is to treat plastic articles with a new anti-skid agent.

Other objects will become apparent as the disclosure develops.

Hence, the present invention provides a method of treating shaped plastic articles with a new anti-skid agent.

The present invention further provides shaped plastic articles treated with the new anti-skid agent.

The new anti-skid agent for use according to the present invention comprises copolymers obtained from ethylene and polar monomers such as vinyl acetate or ethyl acrylate copolymerizable with ethylene, and blends of such copolymers with polyethylenes. Such copolymers and blends continue hereinafter sometimes to be referred to as the new anti-skid agent(s).

Copolymers which may be used as anti-skid agents according to the present invention were first described by M. W. Perrin in U.S. Patent No. 2,200,429. Improved copolymers of ethylene and vinyl acetate were later described by M. J. Roedel in U.S. Patent No. 2,703,794. Blends of such copolymers with polyethylenes were described by R. W. Rees in Canadian Patent No. 680,492 which relates to compositions comprising high density polyethylene and ethylene/vinyl acetate copolymers. In blending polyethylenes and copolymers obtained from ethylene and polar monomers such as vinyl acetate or ethyl acrylate copolymerizable with ethylene, for use as the new anti-skid agent, it is possible to use any polyethylene, not just high density polyethylene.

According to the present invention the shaped plastic article may be treated with the new anti-skid agent by methods involving steps like coating from solution, extrusion, lamination, heat-sealing or spin-welding.

In coating from solution, the new anti-skid agents would normally be dissolved in solvents selected from benzene, xylene, trichloroethylene, perchloroethylene, tetrahydrofuran, mineral spirits and, preferably, toluene in concentrations of from 5–30%. Application of the solution so obtained to the substrate may be by paint brush, paint roller or with the aid of an offset printing press. After application of the solution it is recommended that the coating be baked on to the substrate by the application of radiant heat.

Extrusion and lamination; the new anti-skid agents may be used in the form of film obtained from either the copolymers or the copolymers blended with high, intermediate or low density polyethylenes. For example, in an extrusion operation for fabricating plastic sheet to be used in thermoforming of containers it is practical to extrude the plastic sheet and laminate the film of the anti-skid agent to the hot plastic sheet by passing the sheet and the film together through pressure rolls. Such a laminate will have good anti-skid properties on one side. It is important to note that in a thermoforming operation the anti-skid agent should not contact the mould since the molten anti-skid agent tends to adhere strongly to the mould.

Hea-sealing; the new anti-skid agent may be heat-sealed to a polyethylene article to give an "anti-skid" surface. In this application the anti-skid film should preferably be a blend containing from about 10 to 30% of polyethylene to promote good heat-seal strength.

Spin-welding; the anti-skid agents of the present invention may readily be spin-welded to polyethylene surfaces. In this technique the two pieces may be welded together by spinning one piece, usually the anti-skid agent, at a high speed (3000–4000 r.p.m.) and contacting its surface with the surface of the other piece meanwhile applying a thrust load of about 200 to 600 lbs. The frictional heat so developed is sufficient to melt the two surfaces which then become welded together because of the thrust load exerted.

The shaped plastic articles which may be treated according to the present invention may be made from polyolefins, polyamides, polyesters or regenerated cellulose or other synthetic plastic materials having relatively low friction properties. The polyolefins include homopolymers of ethylene or propylene and copolymers of ethylene and other 1-olefins, such as butene-1. The polyamides include nylon-6,6, nylon-6,10 and nylon-6. The polyesters include polyethylene terephthalate.

The present invention is concerned mostly with the treatment of shaped plastic articles in the form of films, sheets, bags, cartons or other containers but extends also to the treatment of plastic monofilaments.

In practising the process of the present invention it is advantageous to treat the more rigid shaped plastic articles with blends of polyethylenes and copolymers obtained from ethylene and polar monomers. The more flexible articles like films, sheets or bags may be treated with the copolymers without first blending the latter with polyethylenes.

The ethylene/polar comonomer copolymers normally comprise from about 5 to about 50% by weight of polar comonomer. The preferred polar comonomer is vinyl acetate although other comonomers such as acrylates or methacrylates may also be copolymerized with ethylene in these proportions. Copolymers comprising from about 15 to about 40% by weight of vinyl acetate are particularly useful according to the present invention.

As mentioned hereinbefore, all normally solid polyethylenes whether they be of low, intermediate or high density may be used for blending with the ethylene/polar comonomer copolymers. The blends would normally contain up to 80% and preferably not less than 40% by weight of copolymer and may be prepared by mixing the components in any suitable equipment such as a roll mill, an extruder or a "Banbury" mixer. With such blends it has been found that the friction properties are directly proportional to the amount of copolymer present reaching a maximum in the absence of polyethylene.

The following examples serve to illustrate the present invention.

Example 1

A low pressure polyethylene of density 0.960 g./cc. was used to prepare a series of blends containing ethylene/vinyl acetate copolymer (67 wt. percent ethylene/33 wt. percent vinyl acetate). The two components of the blend were passed through a compounding extruder and then extruded and molded into a sheet 0.35 cm. in thickness. Pieces in the form of an annulus having an outer diameter of 5 cms. and inner diameter of 2.5 cms. were stamped out from the sheet and tested for kinetic friction and abrasion resistance properties. Such pieces are illustrated in FIGURE 3 on the attached drawing.

The tests for kinetic friction properties recorded in Table 1 hereafter were conducted by placing a 1 lb. weight on top of the annulus and measuring the force (lbs.) required to slide the weighted annulus at a stated rate over a horizontal surface of high density polyethylene (0.960 g./cc.).

TABLE 1

| Blend of— | | Kinetic friction, lbs. force required | |
|---|---|---|---|
| Polyethylene, wt. percent | Copolymer, wt. percent | 5 cms./min. | 50 cms./min. |
| 10 | 90 | 1.2 | 0.7 |
| 25 | 75 | 0.68 | 0.6 |
| 50 | 50 | 0.48 | 0.40 |
| 75 | 25 | 0.30 | 0.26 |
| 100 | 0 | 0.16 | 0.15 |

The test for abrasion resistance properties recorded in Table 2 hereafter were conducted by placing a 2 lb. weight on top of the annulus and then scraping the latter 10 times on coarse sandpaper (CG3 coarse 3M) a distance of 23 cms. per single scrape.

TABLE 2

| Blend of— | | Percent wt. loss of annulus average of 10 samples | Visual abrasion resistance |
|---|---|---|---|
| Polyethylene, wt. percent | Copolymer, wt. percent | | |
| 10 | 90 | 53 | Fair. |
| 25 | 75 | 30 | Good. |
| 50 | 50 | 16 | Excellent. |
| 75 | 25 | 22 | Do. |

Annuli similar to the ones tested in the above manner were attached, as illustrated in FIGURE 1 on the attached drawing, near the four corners of the base of crates or boxes made from polyethylene by a technique involving spin welding. In this technique the annulus was loaded to about 500 lbs. thrust and was placed upon the end of a device, such as illustrated in FIGURE 2 on the attached drawing, rotating at high speeds (in excess of 3,000 r.p.m.) and became firmly fixed to a polyethylene surface after 1 or 2 secs. upon pressure contact. Sliding of crates or boxes upon each other was effectively reduced once the annuli had been so applied.

Example 2

The low pressure polyethylene of Example 1 was replaced by a high pressure polyethylene of density 0.920 g./cc. and a sheet of a blend was then prepared and tested in the manner outlined in the previous example. A blend of 75% by weight of the copolymer and 25% by weight of the high pressure polyethylene gave a kinetic friction measurement of 1.00 lb. for 5 cms./min. and 0.66 lb. for 50 cms./min. The abrasion resistance of the annuli was good, a percent wt. loss of 25 being observed on the average of 10 samples.

Example 3

An ethylene/vinyl acetate copolymer (72 wt. percent ethylene/28 wt. percent vinyl acetate) was dissolved in toluene in the proportions set out in Table 3 hereafter. The solution was applied from a printing roll to film made from various plastic materials and the film was then tested for its friction properties.

TABLE 3

| Film | Percent copolymer in toluene | Coefficient of Friction | | | |
|---|---|---|---|---|---|
| | | Coated side to coated side | | Coated side to plain side | |
| | | Static | Kinetic | Static | Kinetic |
| Polyethylene (0.925 g./cc.) (untreated control) | 0 | 0.50 | 0.45 | | |
| Polyethylene (0.925 g./cc.) | 5 | 0.95 | 0.95 | 0.6 | 0.6 |
| Do | 10 | 1.01 | 1.01 | 0.7 | 0.7 |
| Do | 18 | 2.60 | 1.24 | 1.36 | 0.73 |
| Polyethylene terephthalate (untreated control) | 0 | 0.35 | 0.22 | | |
| Polyethylene terephthalate | 5 | 0.68 | 0.54 | 0.48 | 0.45 |
| Do | 10 | 2.06 | 1.25 | 0.55 | 0.55 |
| Do | 15 | (*) | (*) | 0.75 | 0.70 |
| Regenerated cellulose (untreated control) | 0 | 0.30 | 0.30 | | |
| Regenerated cellulose | 5 | *2.85 | *1.40 | 0.50 | 0.50 |
| Do | 10 | *2.70 | *2.00 | *1.35 | 0.65 |
| Do | 15 | (*) | (*) | 0.58 | 0.45 |
| Nylon 66 | 13 | 2.42 | *2.33 | | |

*Very tacky.

The solution of copolymer need not be applied by printing roll but may also be applied to the plastic surface by brush, stamp or spray or any other suitable means.

Example 4

The frictional properties of monofilament made from polyethylene may be significantly improved at no loss in tensile strength by coating the monofilament with a copolymer comprising ethylene and vinyl acetate or ethyl acrylate.

The improvement obtained can be demonstrated in the knotting properties of the coated filaments when compared with those of the uncoated filaments. To obtain a measurement of the knotting properties a slip knot was tied on the monofilament. Each end of the knot was grasped in the jaws of an Instron apparatus and the crosshead was set in motion. The following results were recorded:

TABLE 4

| Sample | Load required to cause slippage (in lbs.) |
|---|---|
| Control (uncoated) | .420, .420, .430, .455, .405; avg, 0.43. |
| Ethylene/vinyl acetate copolymer (72:28) | 0.700, 0.630, 0.600, 0.680; avg., 0.65. |
| 70% ethylene/vinyl acetate copolymer (72:28). 30% hydrocarbon wax | 0.595, 0.640, 0.550, 0.595, 0.535; avg., 0.59. |
| Ethylene/vinyl acetate copolymer (67:33) | 0.900, 0.800, 0.870, 0.800, 0.720; avg., 0.82. |
| Ethylene/ethyl acrylate copolymer (88:12) | 0.49, 0.53, 0.51, 0.57, 0.53; avg., 0.53. |

Example 5

Example 1 was repeated by varying the components of a blend containing 25% by weight polyethylene and 75% by weight of a copolymer of ethylene and polar comonomer. Pieces in the form of an annulus having an outer diameter of 5 cms. and inner diameter of 2.5 cms. were again stamped out from sheet prepared from the blends and tested for kinetic friction and abrasion resistance properties.

TABLE 5

| 25 wt. percent Polyethylene | 75 wt. percent Copolymer | Kinetic friction, lbs. force required, cms./min. | | Abrasion resistance |
|---|---|---|---|---|
| | | 5 | 50 | |
| Density: | | | | |
| 0.960 | {Ethylene, 67 wt. percent / Vinyl acetate, 33 wt. percent} | 0.68 | 0.6 | Good. |
| 0.960 | {Ethylene, 88 wt. percent / Ethyl acrylate, 12 wt. percent} | 0.43 | 0.36 | Excellent. |
| 0.920 | {Ethylene, 67 wt. percent / Vinyl acetate, 33 wt. percent} | 1.00 | 0.66 | Good. |

Example 6

Example 3 was repeated using an ethylene/ethyl acrylate copolymer (88 wt. percent ethylene/12 wt. percent ethyl acrylate) and the coefficient of friction of polyehylene film (0.925 g./cc.) treated with a toluene solution of this anti-skid agent by coating with the aid of a printing roll was again determined.

TABLE 6

| Film | Percent copolymer in toulene | Coefficient of friction, coated side to coated side | |
|---|---|---|---|
| | | Static | Kinetic |
| Polyethylene | 0 | 0.50 | 0.45 |
| Do | 5 | 0.71 | 0.58 |
| Do | 10 | 0.78 | 0.78 |
| Do | 15 | 1.08 | 1.08 |

I claim:

1. A process for imparting anti-skid properties to the surface of a container having an exposed polyethylene surface which comprises adhering a plurality of plastic rings having at least one essentially flat surface to said polyethylene surface by rotating said rings at a high speed and thereafter bringing said surfaces into contact with each other under pressure to develop sufficient heat to melt the two surfaces and thereby weld them together, said rings being prepared from polymeric compositions selected from the group consisting of:
   (a) a copolymer comprised of 50 to 95 weight percent of ethylene and 5 to 50 weight percent of vinyl acetate, and
   (b) blends of 10 to 80 weight percent of said copolymer and 90 to 20 weight percent of polyethylene.

2. The process of claim 1 wherein said copolymer contains from 40 to 80 weight percent of ethylene and 15 to 40 weight percent of vinyl acetate and comprises from 60 to 20 weight percent of said blend.

3. A process for imparting anti-skid properties to an article having an exposed surface comprised of a synthetic organic polymeric material which comprises welding by means of frictional heat and pressure a layer of an anti-skid agent to said exposed surface, said anti-skid agent being prepared from polymeric compositions selected from the group consisting of:
   (a) a copolymer of 50 to 95 weight percent of ethylene and 5 to 50 weight percent of a polar comonomer, and
   (b) blends of 10 to 80 weight percent of said copolymer and 90 to 20 weight percent of polyethylene.

4. The process of claim 3 wherein said polar comonomer is selected from the group consisting of vinyl acetate and ethyl acrylate.

5. The process of claim 3 wherein said copolymer contains from 15 to 40 weight percent of vinyl acetate.

References Cited
UNITED STATES PATENTS

| | | |
|---|---|---|
| 3,340,091 | 9/1967 | Zweig. |
| 3,018,195 | 1/1962 | Kelly et al. |
| 3,224,901 | 12/1965 | Teicher. |
| 3,100,056 | 8/1963 | Friday. |
| 3,256,051 | 6/1966 | Howe _____ 156—73 XR |

PHILIP DIER, *Primary Examiner.*

U.S. Cl. X.R.

117—138.8; 156—244; 220—97; 260—86.7, 87.3